July 24, 1962 J. V. BATLEY 3,046,523

COUNTER CHECKING CIRCUIT

Filed June 23, 1958

INVENTOR.
JAMES V. BATLEY

BY Joseph J. Connelton
ATTORNEY

United States Patent Office 3,046,523

Patented July 24, 1962

3,046,523

COUNTER CHECKING CIRCUIT

James V. Batley, Kingston, N.Y., assignor to International Business Machines Corporation, New York, N.Y., a corporation of New York Filed June 23, 1958, Ser. No. 743,687

9 Claims. (Cl. 340—146.1)

The present invention relates to error detecting apparatus and more particularly to error checking apparatus associated with a binary counter.

In digital computing apparatus, as computers increase in size and complexity, it becomes increasingly important to check both logic and arithmetic operations as information is transferred from place to place within the machine to ensure an accurate solution to the problem being solved. One method of accomplishing this result is the use of self-checking circuitry at various points within the machine which checks input information and transfers of information as well as arithmetic and logic operations within the machine and thereby provides rapid detection of errors.

One conventional method of detecting errors associated with arithmetic operations, such as counting, is to employ an additional bit or bits known as parity or redundancy bits to indicate whether the number of predetermined symbols represented in binary form is odd or even. Such a system is also capable of detecting certain errors which may occur as a result of faulty transfer. An example of a parity code generator and error detector circuit is shown in copending application Serial No. 541,-245, filed by Beverly W. Kippenhan, October 18, 1955 now U.S. Patent 2,884,625 and assigned to the assignee of the present invention. While previous parity type checking circuits provide a relatively simple check of the operation of a counter, they are limited to detecting only certain single errors or an odd multiple thereof, and are particularly vulnerable to carry gate failures in flip-flop counters. Using conventional parity checking, such as shown in above copending application, failure of an even numbered carry gate will never be detected, which failure of an odd numbered gate may not be detected under certain circumstances. For example, if a carry gate in a flip-flop counter fails either "ON" or "OFF" with an odd number of consecutive ones on its high order side, the error will go undetected since an even number of flip-flops will be affected by the failure. In addition, through the use of self-checking circuitry at various areas within the machine, a computer may have the ability to detect and isolate errors caused by failure of a single component part and thereby provide a simplified replacement approach to maintenance.

Accordingly, the present invention is directed to a checking circuit adapted to detect errors produced during transfer or resulting from faulty operation of circuit components. In the description of the invention herein given by way of disclosure, the principles of the present invention are illustrated in a binary register or counter which utilizes a parity check system. The parity of the word in the counter is checked and if correct, utilized to predict the parity of the next count. Upon receipt of the next count pulse, the parity of the new count is compared against the predicted parity, and a non-comparison indicates an error. Thus, associated with a counter, the parity of the sum is predicted before the count, and checked or verified after the count. Employed with a register, the parity of the information transferred to the register is initially checked against the contents of the register to detect transfer errors. The predicted parity is determined by determining the number of flip-flops to be complemented by the next count pulse, which is equal to one plus the number of consecutive ones in the low order end of the counter, and adding (sum modulo 2) the parity of the resultant to the parity of the contents of the counter. Utilizing this concept, the present invention employs a logical arrangement of And and Or circuits and an Exclusive Or matrix or network operating on a timed shared basis to check the parity of the word in the counter or register, predict the parity of the next word and verify that this predicted parity corresponds to the actual parity of the new word.

Accordingly, a primary object of the present invention is to provide an improved checking apparatus.

Another object of the present invention is to provide an improved error detecting apparatus for use with a binary register or counter.

A further object of the present invention is to provide an improved checking apparatus utilizing an Exclusive Or matrix for checking a parity of a word in a counter or register and predicting the parity of the ensuing word.

Another object of the present invention is to provide an improved checking apparatus for use with a binary counter utilizing a parity bit, wherein the parity of the counter is checked, the parity of the ensuing word predicted and the actual parity of the new word compared with the predicted parity.

Still another object of the present invention is to provide a parity prediction circuit which predicts the parity of the next word in a binary counter by determining the number of flip-flops to be complemented by the next count pulse.

Another object of the present invention is to provide an improved checking circuit including an Exclusive Or matrix to predict the parity of the next word in a binary counter by adding one to the number of consecutive one's in the low order end of a counter.

Another object of the present invention is to provide a self-checking binary counting circuit operating on a cycle of checking the parity of the counter, predicting the parity of the next count, counting and comparing the parity of the new word in the counter with the predicted parity.

Other objects of the invention will be pointed out in the following description and claims and illustrated in the accompanying drawings which disclose, by way of example, the principle of the invention and the best mode, which has been contemplated, of applying that principle.

Figure 1:
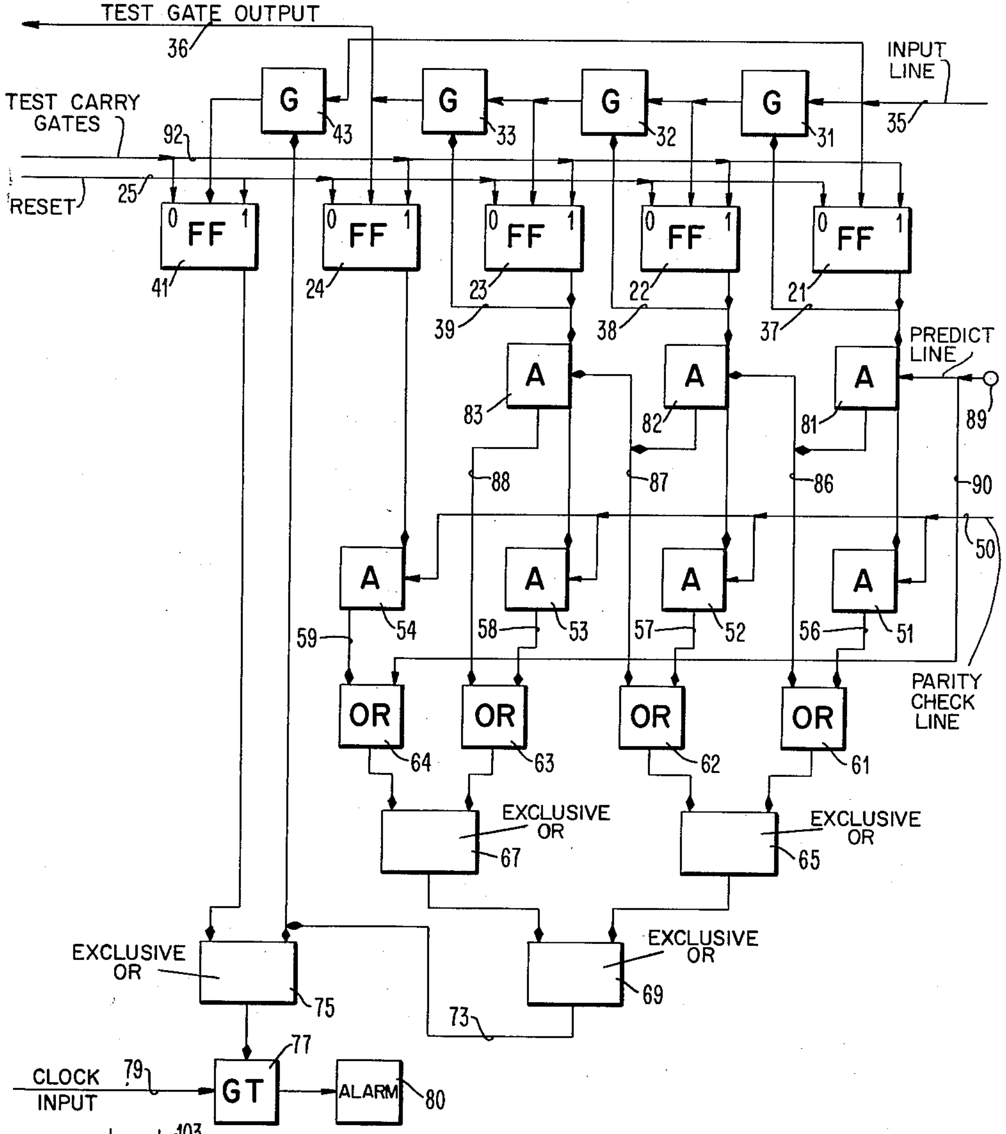
FIG. 1 illustrates in block schematic form a checking system in accordance with the principles of the present invention.

Throughout the following description and in the accompanying drawings the following conventions are employed:

In the drawing, a conventional, solid arrowhead is employed to indicate (1) a circuit connection, (2) energization with standard pulses and (3) the direction of pulse travel which also indicates the direction of control. A solid, diamond-shaped arrowhead indicates (1) a circuit connection and (2) energization with a D.C. level. The input and output lines of the block symbols are connected to the most convenient side of the block. An input line to a corner of a first gate block symbol may be continued along an edge of that block and to a similar point (i.e., input) of a second adjacent gate block symbol, in order to illustrate the fact that the inputs of such gates are intended to be energized from a common source. Bold face character symbols appearing within a block symbol identify the common name of the circuit represented, that is, FF identifies a flip-flop, G a gate circuit, Or a logical Or circuit, the symbol ⊻ a logical Exclusive Or circuit, and so forth.

Referring now to FIG. 1, there is shown a register comprising flip-flops 21–24 wherein flip-flop 21 represents the $2^0$ order in binary representation, flip-flop 22 the $2^1$ order, flip-flop 23 the $2^2$ order and so forth. Each of flip-flops 21–24 is a bi-stable device wherein one of the stable states is referred to as the "one" state, the other as the "zero" state, these states being indicated on the drawings as 0 and 1 respectively. While a four stage register is illustrated in the preferred embodiment, the present invention is equally applicable to registers and counters of greater or fewer number of stages. The purpose of flip-flops 21 through 24 is to receive and represent the number of bursts of time sequential impulses appearing on INPUT LINE 35. The number of impulses in any one burst may be less than or equal to the capacity of the register. While it is possible for these pulses to be spaced irregularly in time with respect to each other, for purposes of simplifying the present explanation it is assumed that impulses within any one burst are uniformly spaced apart from each other and that all such pulses are of like duration.

These flip-flops may be any suitable one of several well-known types, but are preferably of the type shown and described in copending application Serial No. 414,459 entitled "Electronic Digital Computer," filed March 5, 1954 by B. L. Sarahan et al., now Patent 2,994,478, Aug. 1, 1961 and assigned to the assignee of the instant invention. These flip-flops when in the 0 and 1 states provide a positive D.C. level signal at the corresponding output. Flip-flops 21–24 have three inputs, the binary one or "set" input, the binary zero or "reset" input and the complement input shown between the 1 and 0 inputs which, when energized, functions to complement or change the state of the associated flip-flop. The preferred embodiment as shown utilizes only the binary one output of flip-flops 21–24.

Gate circuits 31–33 are conditioned by the one output flip-flops 21–23 respectively and perform in conjunction with the flip-flop register as a counting device to establish a count of the pulses received on input line 35. Although these gate circuits may be any suitable one of several well-known varieties, they are preferably of the type shown and described in the above Patent 2,994,478.

Before describing the operation of the present invention, the operation of the flip-flop counter circuit will be briefly described. Prior to any counting operation, a pulse from a source not shown is applied to line 25 labeled RESET, in order to reset flip-flops 21–24 to the 0 state and to shift parity flip-flop 41 to its one state. The first count pulse applied to input line 35 complements flip-flop 21 to the one state, thereby conditioning carry gate circuit 31 through conductor 37. The complement operation of changing a flip-flop from its existing stable state to the opposite stable state may be accomplished in several ways. One method described on page 14, line 19, of the above cited Patent 2,994,478 is to apply a single pulse to the one and zero inputs simultaneously. A second count pulse on line 35 complements flip-flop 21 to the 0 state and passes through gate circuit 31 to complement flip-flop 22 to the one state, thereby conditioning gate circuit 32 through conductor 38. The next input pulse complements flip-flop 21 to the one state thereby conditioning gate circuit 31 through conductor 37. The fourth count pulse complements flip-flop 21 to the 0 state, flip-flop 22 to the 0 state through gate circuit 31 and flip-flop 23 to the one state through gate circuit 32. In this manner the count is propagated through the counter stages until a maximum count of 15 is reached at which time flip-flops 21–24 are in the one state.

From the above description it will be readily apparent how the flip-flop register in conjunction with the associated carry gate circuits performs as a counter circuit. In addition to flip-flops 21–24 in the register, a fifth flip-flop 41, hereinafter designated as the parity flip-flop, is used to indicate the parity of the count being generated. Associated with parity bit flip-flop 41 is a gate circuit 43 which when conditioned in a manner fully described hereinafter will pass an input pulse to complement the parity flip-flop whenever the parity in the count is to be changed.

Basically, the present invention operates by checking the parity of the word in the register or the word to be counted, predicting the parity of the new count, and after counting, checking this parity against the predicted parity to determine whether or not the parity has been generated and indicating an error where the predicted parity does not correspond with the actual parity. This cycle is repeated for each counting operation each time a new impulse in a burst of impulses is received from line 35. In the ensuing description, the operation of the device will be described with respect to even parity, though it may obviously be modified to work with odd parity if so desired. The term "even parity" as herein employed defines the condition wherein the number of 1's in the register, including the parity stage, is even.

In the next immediate section of this description the operation of the apparatus for checking the parity of the number of pulses registered in flip-flops 21 through 24 is described. For purposes of description, it is assumed that parity flip-flop 41 already has been set in accordance with the parity of the number already registered within flip-flops 21 through 24. It is the purpose of the next described apparatus to determine the parity status of flip-flops 21 through 24 and to compare that determined status to the parity status already indicated by the condition of flip-flop 41.

In order to drive the checking apparatus in the desired manner, I provide an external pulse source or sources (not shown) which may be of any of a number of well-known types. This external source is arranged so that a pulse appears on PARITY CHECK LINE conductor 50 at some time following but not over-lapping in time impulse on appearing conductor 35. Similarly, the external source supplies to PREDICT LINE 89 a pulse corresponding to each impulse appearing on conductor 35, and which substantially coincides in time with the next-occurring impulse on conductor 35. The aforementioned external signal source also supplies a gating impulse to conductor 79 substantially in coincidence with impulses present on PARITY CHECK LINE 50.

It will be noted that And circuits 51–54 are conditioned by the one output of flip-flops 21–24 respectively. Depending on the count in the register, a count pulse applied to parity check line 50 will provide an output from the conditioned ones of And circuits 51–54, which are applied through conductors 56–59 to Or circuits 61–64 respectively. The outputs from Or circuits 61 and 62 comprise the inputs to Exclusive Or circuit 65, while the output from Or circuits 63 and 64 comprise the inputs to Exclusive Or circuit 67. As well known in the art, an Exclusive Or circuit is a logical circuit which provides an output when and only when either of the inputs are present but not both. Thus if either of the two lower stages of the counter are in the one state, an output will be provided through the associated Or circuit 61 or 62 to Exclusive Or circuit 65, which will in turn provide an input to Exclusive Or circuit 69. On the other hand, if both stages are in the one or zero state, no output will be provided to Exclusive Or circuit 65. In like manner, the contents of the two upper counter stages will control the output from Exclusive Or circuit 67 such that if either flip-flop 23 or 24 is in the one state, the associated And circuit 53 or 54 will be conditioned and a signal applied to conductor 50 will produce an output signal through conductors 58 and 59 to Or circuits 63 and 64 respectively. Since Exclusive Or circuit 69 operates in a manner identical to Exclusive Or circuits 65 and 67, it will be evident that an output will be provided by Exclusive Or circuit 69 on conductor 73 only when the 4 stage register contains an odd number of ones. For example, if the lower two stages contain either 1's or 0's, an output will not be provided from Exclusive Or circuit 65, and similarly if both the upper stages contain either 1 or 0 no output will be provided from Exclusive Or circuit 67. Thus the only time in which an output can be provided from the cascaded arrangement of Exclusive Or circuits 65, 67 and 69 is when the register contains an odd number of 1's. It is pointed out that when the above described output impulse appears on conductor 73, such impulse also conditions And gate 43. However, since there is no impulse applied at this time to input conductor 35, no signal appears at the output of the gate 43 at this time. The purpose of gate 43 is to be set forth in a presently occurring section of this description.

Using the even parity system, when the register does contain an odd number of 1's, the parity bit flip-flop should also contain a 1. It will be noted that the output from parity bit flip-flop 41 together with the output from Exclusive Or circuit 69 comprises the two inputs to Exclusive Or circuit 75. If the output from parity flip-flop 41 is a 1, and an odd number of 1's are present in the register, both inputs to Exclusive Or circuit 75 will be energized, and no output will be provided. Both conditions indicate that the parity of the words in the register is correct. On the other hand, if the parity is a 0 at the time that an odd number of 1's are in the register, an output will be provided through Exclusive Or circuit 75 to condition gate circuit 77. Gate circuit 77 is sampled by a pulse on conductor 79 after the parity check operation, and when conditioned as above-described will energize alarm circuit 80 to indicate an error. Likewise, if the parity is a 1 when there are an even number of 1's in the register, an output indicative of an error condition is provided from the parity flip-flop through Exclusive Or circuit 75.

Assuming the parity of the word in the register is correct and that the above described check for parity of the number correctly registered in flip-flops 21 through 24 has been compared successfully to the indicated parity registered in flip-flop 21, the next described operation is to predict the parity of the succeeding word, and based upon the prediction to selectively condition the gate circuit 43 used to complement the parity bit flip-flop 41. From the above description it is pointed out that a pulse now appears on PREDICT LINE 89 and that this impulse is substantially in coincidence with the presently occurring impulse (if any) present on INPUT LINE 35. It will be noted that And circuits 81, 82 and 83 are also conditioned by the one outputs of flip-flops 21, 22 and 23 respectively. In addition, And circuits 81–83 are connected in a serial fashion so that the outputs from And circuits 81 and 82 constitute inputs of And circuits 82 and 83 respectively. To predict the parity of the succeeding count, it is necessary to determine the parity of the number of flip-flops to be complemented by the next count pulse and apply this parity together with the parity of the contents of the counter to an Exclusive Or circuit. As more fully described hereinafter, the number of flip-flops to be complemented in turn is equal to 1 plus the number of consecutive 1's appearing at the low order end of the counter. Thus the outputs of And circuits 81, 82 and 83 are connected through conductors 86, 87 and 88 and Or circuits 61, 62 and 63 respectively to Exclusive Or circuits 65 and 67 in the manner illustrated. When a signal is applied to conductor 89, the Exclusive Or matrix comprising circuits 65, 67 and 69 operates in the above-described fashion to provide an output on conductor 73 only when the number of consecutive 1's starting from the lower end of the counter is odd. At this point it is mentioned that any pulse produced on conductor 73 from impulses applied to PREDICT LINE 89 may or may not result in the production of an output at Exclusive Or gate 75. However, exclusive Or gate 75 output signals produced at this time are ineffective to trigger alarm 80, since such signals merely condition And gate 77, there being no input impulse applied to gate 77 over conductor 79 at this time.

The prediction of parity change will determine whether the parity gate 43 will be conditioned, since any change of parity of the word in the register will require a corresponding change in the parity bit. As heretofore described, the parity gate 43 is conditioned by the output from the final Exclusive Or circuit 69 in the Exclusive Or circuit array. Considering first the two conditions where there is an odd number of consecutive 1's in the lower end of the counter, assuming a single 1 in flip-flop 21, And circuit 81 is conditioned so that upon application of pulse to input terminal 89, the output on conductor 86 is applied through Or circuit 61 to Exclusive Or circuit 65 and also conditions And circuit 82. The input signal applied to input terminal 89 is also applied through conductor 90 and Or circuit 64 to Exclusive Or circuit 67. Thus a single input will be provided to Exclusive Or circuits 65 and 67, thereby effectively inhibiting Exclusive Or circuit 69 and preventing it from conditioning gate circuit 43.

Under the other condition wherein the register would contain an odd number of consecutive 1's, namely three, And circuits 81, 82 and 83 are conditioned by the 1 output from flip-flops 21, 22 and 23 respectively. When an input pulse is applied to conductor 89, it is propagated through the serially connected And circuits to produce signals on conductors 86, 87 and 88, while it is applied directly through conductor 90 to Or circuit 64. Under this condition, all four inputs to the Exclusive Or circuits 67 and 65 are energized, thereby inhibiting Exclusive Or circuit 69. Thus where the register contains an odd number of consecutive 1's, no change results in the parity count and the parity gate circuit 43 remains deconditioned.

Assuming now that the register contains either no 1's or an even number of consecutive 1's from the lowest order stages, two possibilities exist, no 1's or two 1's. The condition of a full register having an even number of stages is an exception to this rule as more fully described hereinafter. Under the condition where no 1's are present, none of And circuits 81, 82 and 83 are conditioned. When a signal is applied to input terminal 89, it is applied via conductor 90 and Or circuit 64 to Exclusive Or circuit 67, the resulting output of which is applied to Exclusive Or circuit 69. Since no signals are applied to Exclusive Or circuit 65, the resulting output signal from Exclusive Or circuit 69 conditions parity gate circuit 43. Under the second condition where the lower two stages in the one state, And circuits 81 and 82 are conditioned, and upon application of a signal to input terminal 89, the signals generated on conductors 86 and 87 are applied through Or circuits 61 and 62 to Exclusive Or circuit 65, while the input signal is applied through conductor 90 to Or circuit 64. Exclusive Or circuit 65 is thus inhibited, but the output from Or circuit 64 is applied through Exclusive Or circuits 67 and 69 to condition gate circuit 43. When parity gate 43 is conditioned, upon receipt of the next count pulse applied to input conductor 35, the resulting output from gate circuit 43 complement the parity flip-flop 41 thereby changing the parity as predicted.

Summarizing the above sequence, if there is an odd number of consecutive 1's in the low order end of the counter, the parity will not be changed on the next count; if there is an even number of consecutive 1's in the low order end of the counter, the parity gate circuit is conditioned to complement the parity flip-flop upon receipt of the next count pulses.

The only exception to the parity change for an even number of consecutive 1's occurs in a full register having an even number of stages. In the illustrated embodiment, if the four stages shown by flip-flops 21 through 24 are in the one state, the parity will not change. This condition causes inputs to be applied to both of Exclusive Or circuits 65 and 67, and thereby effectively inhibiting them and preventing any input from being applied through Exclusive Or circuit 69 to condition parity gate circuit 43.

Following the prediction of parity, the next step in operation of the subject device is to compare the actual parity with the predicted parity following the add operation. In the ensuing description, it is assumed that there was an even number of consecutive 1's in the register prior to add and a parity change was predicted. Under this condition, the output signal on conductor 73 from Exclusive Or circuit 69 conditions the parity gate 43 and is also applied as one of the inputs to Exclusive Or circuit 75. Upon receipt of the next count pulse applied to input conductor 35, the counter circuit will operate in the conventional manner to add 1 to the contents of the register and simultaneously sample parity gate circuit 43, the output of which complements parity flip-flop 41. Since the parity flip-flop 41 was in the zero state under the assumed condition, it will be complemented to the one state and the resulting output on conductor 71 will be applied as the second input to inhibit Exclusive Or circuit 75. If the parity flip-flop 41 was not complemented to the one state, the output from Exclusive Or circuit 69 would be applied to Exclusive Or circuit 75 to condition a gate circuit 77. This gate circuit is sampled after the parity check operation and when conditioned, the resulting output energizes alarm device 80.

Assuming that there was an odd number of consecutive 1's in the register as heretofore described, there should be no output from Exclusive Or circuit 69 and parity gate circuit 43 should not be conditioned. If, however, a parity signal should be generated on conductor 73, it would be applied to Exclusive Or circuit 75 to actuate the alarm device 80 in a manner heretofore described. Both of the above-described conditions represent error conditions. Thus effectively Exclusive Or circuit 75 operates as the parity comparison device to selectively actuate an alarm device where the actual parity differs from the predicted parity.

The above described operation comprises one complete operating cycle of the subject device wherein a count is transferred to or generated in the register, the parity of the register checked the parity of the next count predicted, and the resulting parity compared with the predicted parity. Failure to compare indicates an error. Under each step in this sequence, an indication of error which may result from component failure is provided and any indication of error actuates an alarm circuit, thereby indicating the error at the time it occurs.

An additional test of the carry gates is provided in the following manner. When a signal is applied to conductor 92 labeled TEST CARRY GATES, flip-flops 21 through 24 are set in the 1 state, thereby conditioning carry gate circuits 31, 32 and 33, while parity flip-flop 41 is set to the 0 state. Upon applying a count pulse to input conductor 35, flip-flops 21 through 24 are complemented to the zero state, thereby effectively clearing the register for the ensuing operation. An output signal from gate circuit 33 applied to conductor 36 indicates that all the gate circuits are functioning satisfactorily.

Figure 2:
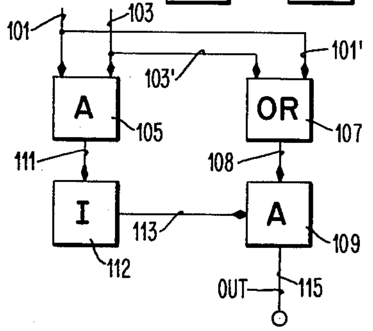
FIG. 2 illustrates in block form an Exclusive Or circuit of the type shown as block 65 in FIG. 1.

Referring now to FIGURE 2, there is illustrated in block form by way of example an Exclusive Or circuit of the type shown as block 65 in FIGURE 1. As shown, the Exclusive Or arrangement comprises a configuration of three basic logical circuits. The two inputs designated by conductors 101 and 103 are connected to And circuit 105 and through conductors 101' and 103' to Or circuit 107. The output from Or circuit 107 is connected via conductor 108 to And circuit 109, while the output from And circuit 105 is connected via conductor 111 to inverter 112. In the positive logic herein employed, inverter 112 is a circuit which when de-energized applies a positive signal to logical And circuit 109 via conductor 113. When energized, however, inverter 112 applies a negative signal to conductor 113.

An Exclusive Or circuit, as heretofore described, generates an output signal when and only when either of the inputs are present. If either input is energized, the resultant level is applied through Or circuit 107 to And circuit 109, which is normally conditioned by inverter 112 so that an output signal is provided on output conductor 115. If neither input is energized, no signal will be applied from the Or circuit 107 to And circuit 109. If both inputs are present, the output from And circuit 105 actuates inverter circuit 112, which causes a negative signal to be applied via conductor 113 to inhibit And circuit 109.

There has been shown and described a novel counter checking circuit which checks the parity of each count and predicts the parity of the next count. By employing similar circuits with the various registers and counters in a computer, errors resulting from component failure or other reasons can be quickly detected and corrected. By applying the above described testing signals to the device in proper sequence, the checking is accomplished automatically, resulting in economy of maintenance and more reliable apparatus.

While the logical And and Or circuits shown in block form throughout the drawing may be any one of several well-known types, they are preferably of the type shown in the aforenoted U.S. Patent 2,994,478. The inverter 112 used in the Exclusive Or configuration is shown and described in copending application Serial No. 494,982 entitled "Magnetic Data Storage" filed by Robert R. Everett et al. on March 17, 1955, now U.S. Patent 2,988,735.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An error checking counting circuit comprising a plurality of bi-stable devices connected in binary counting fashion, carry gate circuits connected between adjacent stages in said counter, parity means coupled to said bistable devices for indicating the parity status of said devices, said bistable devices being connected to individually associated logical And circuits to thereby condition said And circuits when said associated bi-stable devices are in a predetermined state, a network including Exclusive Or gates selectively connected to the outputs from said logical And circuits, pulse means applied to said And circuits whereby said applied pulses will be passed by said conditioned And circuits to said Exclusive Or gates to indicate the parity of the count in said counter, and means for comparing the parity status of the count indicated by said parity means with the output from said network.

2. A parity checking circuit for checking the parity of the contents of a register comprising a plurality of bi-stable devices connected in binary fashion, parity determining means including a plurality of logical And circuits selectively associated with said bi-stable devices, pulse means coupled to said logical And circuits for making output signals from said parity determining means to indicate the status of said bi-stable devices, other means operative for indicating the parity status of said register devices, comparing means operative for comparing the contents of said parity determining means with the contents of said other parity indicating means, means controlled by said comparing means for indicating the noncomparison of said contents of said register and said parity determining means.

3. A parity checking circuit of the type claimed in claim 2 wherein said parity determining means also includes Exclusive Or gates selectively connected to said logical And circuits, said Exclusive Or gates being operative to indicate the parity status of said register devices.

4. A cheecking circuit of the type claimed in claim 2 wherein said comparing means includes an Exclusive Or circuit having first and second inputs coupled to the outputs of said parity determining means and said other parity indicating means, respectively.

5. A system comprising in combination a count device having an input and being operative for generating signals representative of a count of signals applied to said input, means coupled to said count device input for generating a signal representative of the parity of impulses applied to said count device input, means coupled to the output of said count device for comparing the parity of a count registered in said count device with the parity signal produced by said parity signal generating means, and means associated with said comparison means for selectively generating an error detection signal in the event of non-comparison.

6. A counter checking and verifying system comprising in combination a binary counter having an input to which signals may be applied and including a plurality of bi-stable devices connected in binary counting fashion operative for registering the count of signals applied to said input, means for indicating the parity of signals applied to said counter input, means including a gate for coupling said parity indicating means to said input, means for checking the parity of the count registered in said binary counter, means for comparing the contents of said parity indicating means with said parity checking means, means for predicting the parity of the succeeding count in said sounter and for controlling the operation of said gate on the basis of said prediction, and means for comparing the predicted parity indicated by said parity indicating means against the actual parity indicated by said parity checking means upon receipt of the next count pulse.

7. A device of the character described in claim 6 and further including means responsive to the non-comparison of said predicted and actual parity for indicating an error.

8. A checking circuit for indicating failure of a binary counter having an input to which signals may be applied and comprising a plurality of bi-stable devices connected in binary counting fashion, carry gate circuits connected between adjacent stages in said counter, a network including a first plurality of logical And circuits connected to the outputs from each stage of said counter for indicating the parity of the count registered in said binary counter, a bi-stable device for indicating the parity of the contents of said counter, an And gate for coupling said bi-stable parity device to said counter input, said network also including a plurality of Exclusive Or gates having inputs selectively connected to said first plurality And circuits for comparing the output from said parity indicating bi-stable device with the output from said counter, said network also including said second plurality of logical And circuits, said second plurality of And circuits and certain ones of said Exclusive Or gates being operative for predicting the parity of the succeeding count in said counter, said Exclusive Or gates being coupled to and operative in response to the prediction of a change of parity by said second plurality And gates for enabling said coupling And gate in order to change the status of said parity indicating device on the succeeding count and means for verifying the predicted parity against the actual parity of each count, any difference between actual and predicted parity indicating a failure of said counter.

9. A parity predicting counting circuit comprising a binary counter, each stage of said counter including a bi-stable device, means coupled to said counter for applying input signals thereto, a plurality of logical And circuits connected to and conditioned by selected ones of said bi-stable devices, means responsive to signals applied to said And circuits for generating parity prediction signals indicative of the parity of the next input signal applied to said counter, a bi-stable device for indicating the parity of the contents of said counter and means for selectively modifying the state of said parity indicating device in accordance with said parity prediction means upon receipt of the next input signal.

References Cited in the file of this patent

UNITED STATES PATENTS

| | | |
|---|---|---|
| Re. 23,601 | Hamming et al. | Dec. 23, 1952 |
| 2,550,600 | Rehm | Apr. 24, 1951 |
| 2,674,727 | Spielberg | Apr. 6, 1954 |
| 2,719,959 | Hobbs | Oct. 4, 1955 |
| 2,848,607 | Maron | Aug. 19, 1958 |
| 2,854,653 | Lubkin | Sept. 30, 1958 |
| 2,884,625 | Kippenhan | Apr. 28, 1959 |
| 2,892,888 | James et al. | June 30, 1959 |
| 2,894,684 | Nettleton | July 14, 1959 |
| 2,897,480 | Kumagai | July 28, 1959 |